United States Patent
Hatano et al.

(10) Patent No.: US 10,105,752 B2
(45) Date of Patent: Oct. 23, 2018

(54) TURBINE BLADE MANUFACTURING METHOD

(71) Applicant: MITSUBISHI HITACHI POWER SYSTEMS, LTD., Kanagawa (JP)

(72) Inventors: Kohei Hatano, Tokyo (JP); Hiroharu Oyama, Tokyo (JP); Yasuo Matsunami, Tokyo (JP); Naoyuki Umezu, Tokyo (JP); Shuhei Kuroki, Tokyo (JP); Hidetaka Haraguchi, Tokyo (JP); Takumi Matsumura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 184 days.

(21) Appl. No.: 15/106,901

(22) PCT Filed: Jan. 27, 2015

(86) PCT No.: PCT/JP2015/052238
§ 371 (c)(1),
(2) Date: Jun. 21, 2016

(87) PCT Pub. No.: WO2015/115443
PCT Pub. Date: Aug. 6, 2015

(65) Prior Publication Data
US 2016/0339507 A1    Nov. 24, 2016

(30) Foreign Application Priority Data
Jan. 31, 2014  (JP) .................. 2014-017837

(51) Int. Cl.
| | | |
|---|---|---|
| C22C 38/44 | (2006.01) |
| B21K 3/04 | (2006.01) |
| B23P 15/02 | (2006.01) |
| C21D 9/00 | (2006.01) |
| F01D 5/22 | (2006.01) |
| F01D 5/28 | (2006.01) |
| B21J 1/06 | (2006.01) |

(52) U.S. Cl.
CPC ............ B21K 3/04 (2013.01); B23P 15/02 (2013.01); C21D 9/00 (2013.01); C21D 9/0018 (2013.01);
(Continued)

(58) Field of Classification Search
CPC ............ B22F 2998/10; B22F 2201/00; B22F 2201/50; B22F 3/24; B22F 3/17;
(Continued)

(56) References Cited

U.S. PATENT DOCUMENTS
2012/0133089 A1    5/2012  Kobayashi et al.

FOREIGN PATENT DOCUMENTS
| CN | 1644271 | 7/2005 |
|---|---|---|
| CN | 101235449 | 8/2008 |

(Continued)

OTHER PUBLICATIONS

English translation of JP 2013-170559.*
(Continued)

*Primary Examiner* — Jun Yoo
(74) *Attorney, Agent, or Firm* — Wenderoth, Lind & Ponack, L.L.P.

(57) ABSTRACT

A method of manufacturing a turbine blade, the method comprising forming a forging by forging stainless steel; heat treating the forging; and cooling the forging after the heat treatment; wherein in the heat treatment and the cooling, a plurality of the forgings are arranged in alignment, and adjacent forgings of the plurality of forgings are disposed so that at least respective portions of portions of the adjacent forgings corresponding to a region from a portion corresponding to a platform of a turbine blade to a center in a longitudinal direction of the turbine blade face each other and warm each other via radiant heat.

10 Claims, 12 Drawing Sheets

(52) U.S. Cl.
CPC ........... *C21D 9/0068* (2013.01); *F01D 5/225* (2013.01); *F01D 5/28* (2013.01); *B21J 1/06* (2013.01); *F05D 2220/31* (2013.01); *F05D 2230/25* (2013.01); *F05D 2300/171* (2013.01)

(58) Field of Classification Search
CPC .......... B22F 2003/248; B22F 2003/175; B22F 5/04; B21K 3/04; B21K 29/00; F01D 5/28; F01D 5/286; F01D 5/12; F01D 5/14; B23P 15/02; Y10T 29/49336; F05D 2230/25; F05D 2230/40; F05D 2220/30; B21J 1/06; B21J 1/04; C21D 9/0068
See application file for complete search history.

(56) References Cited

FOREIGN PATENT DOCUMENTS

| | | |
|---|---|---|
| CN | 201883122 | 6/2011 |
| CN | 102460052 | 5/2012 |
| CN | 102994715 | 3/2013 |
| JP | 2007-146204 | 6/2007 |
| JP | 2010-1548 | 1/2010 |
| JP | 2012-140690 | 7/2012 |
| JP | 2013-170559 | 9/2013 |
| WO | 2010/143640 | 12/2010 |

OTHER PUBLICATIONS

English translation of JP 2010-001548.*
International Search Report dated Mar. 24, 2013 in International (PCT) Application No. PCT/JP2015/052238.
Written Opinion of the International Searching Authority dated Mar. 24, 2015 in International (PCT) Application No. PCT/JP2015/052238, with English translation.
Notification of the First Office Action dated Dec. 2, 2016 in corresponding Chinese Application No. 201580003138.X, with English translation.

* cited by examiner

TURBINE BLADE MANUFACTURING METHOD

TECHNICAL FIELD

The present invention relates to a method of manufacturing a turbine blade.

BACKGROUND ART

Stainless steel members, after being forged or rolled into a predetermined shape, are commonly subjected to heat treatments such as solution treatment.

For example, Japanese Unexamined Patent Application Publication No. 2012-140690A discloses technology of heat treating a stainless steel member, wherein the stainless steel member is forged at high temperatures from 1000 to 1300° C., cooled, and then heated again at high temperatures from 950 to 1125° C. This technology comprises rapidly cooling the stainless steel member after heating at a cooling rate of 5 to 4° C./min.

In addition to the technology described in Japanese Unexamined Patent Application Publication No. 2012-140690A, the technology described in Japanese Unexamined Patent Application Publication No. 2007-146204A is also technology related to the present invention. This technology relates to heat treating an aluminum alloy member, wherein the aluminum alloy member is heated, then rapidly cooled by a cooling medium sprayed from a plurality of nozzles. When a metal member is rapidly cooled, due to the shape of the metal member, some portions tend to cool faster than other portions and some portions tend to cool slower. Thus, high and low temperature portions are created within the metal member. Consequently, at the cooling stage of the metal member, thermal stress and strain are caused in the metal member. In light of this, the technology described in Japanese Unexamined Patent Application Publication No. 2007-146204A comprises adjusting the amount of cooling medium sprayed from the plurality of nozzles to minimize or prevent strain caused in the aluminum alloy member at the rapid cooling stage.

Technical Problem

The technology of Japanese Unexamined Patent Application Publication No. 2007-146204A relates to aluminum alloy members. However, stainless steel members and aluminum alloy members have different properties. Thus, if the technology described in Japanese Unexamined Patent Application Publication No. 2007-146204A is applied to a stainless steel member after it is heated as a part of heat treatment without modification, the strain caused at the cooling stage is difficult to minimize or prevent. Also, the technology described in Japanese Unexamined Patent Application Publication No. 2007-146204A is effective for heat treatment at comparatively low temperatures. For example, heat treatment at comparative low temperatures such as 500° C. or less is not greatly affected by heat radiation, and thus by controlling heat transmission due to convection, the temperature of the object to be heat treated can be controlled. However, solution treatment required for precipitation hardening of stainless steel requires temperatures up to 1000° C. In such cases, if heat radiation is not controlled, the temperature of the object to be heat treated is difficult to control.

SUMMARY OF INVENTION

An object of the present invention is, in the manufacture of a stainless steel turbine blade, to minimize or prevent deformation caused in a stainless steel member at the cooling stage post heat treatment of the member.

Solution to Problem

The present invention is a method of manufacturing a turbine blade, the method comprising the steps of:
  forming a forging by forging stainless steel;
  heat treating the forging; and
  cooling the forging after the heat treatment; wherein
  in the heat treatment and the cooling,
  a plurality of the forgings are arranged in alignment, and
  adjacent forgings of the plurality of forgings are disposed so that at least respective portions of portions of the adjacent forgings corresponding to a region from a portion corresponding to a platform of a turbine blade to a center in a longitudinal direction of the turbine blade face each other and warm each other via radiant heat.

In the heat treatment and the cooling, non-uniformity in the amount of radiant heat can be minimized or prevented by disposing the forgings in alignment. Accordingly, the method of manufacturing a turbine blade according to the present invention can minimize or prevent non-uniformity in the cooling rate within a single forging, and thus non-uniformity in the deformations of each forging. In such a manner, the method of manufacturing a turbine blade according to the present invention can, for example, in the manufacture of a stainless steel turbine blade, minimize or prevent deformation caused in a stainless steel member at the cooling stage after heat treatment of the member. The method of manufacturing a turbine blade according to the present invention is not limited in application to stainless steel and can be applied to any heat treatment in which a forging is heated to approximately 1000° C.

Preferably, the plurality of forgings are accommodated in an accommodating structure to carry out the heat treatment and the cooling, and a heat insulation shield is disposed between the forging accommodated opposing an inner wall of the structure and the structure. The shield can reduce the cooling rate of the forgings disposed opposing them. Consequently, the difference in temperature between the thick portion and thin portion of the forging is reduced, and thus deformation of the forging is minimized or prevented.

Preferably, the shield is a plate-like member, and a thickness of the shield is identical to a cross-sectional maximum thickness in the portion of the forging corresponding to the region from the portion corresponding to the platform of the turbine blade to the center in the longitudinal direction of the turbine blade. The heat insulation effectiveness of the radiant heat of the shield can be equal to that of the radiant heat of the forging. Thus, non-uniformity in the temperature of individual forgings and across the plurality of forgings can be minimized or prevented, and thus deformation and non-uniformity in deformation of the forgings upon cooling can be minimized or prevented.

Preferably, the maximum thickness is a cross-sectional maximum thickness at a starting point of bending of the forging occurring after the heat treatment. A main deformation of the forging that occurs upon cooling is bending of the forging. Bending of the forging is greatly affected by the starting point of bending. By setting the thickness of the shield to the cross-sectional maximum thickness at the starting point of bending that occurs in the forging, non-uniformity in the temperature at the starting point of bending and the vicinity thereof can be minimized or prevented, and thus deformation of the shield can be effectively minimized or prevented.

Preferably, in the cooling step, rectified cooling gas is supplied to the plurality of forgings. By supplying rectified cooling gas to the members, deformation of the forging during cooling can be minimized or prevented.

Preferably, the stainless steel is precipitation hardening stainless steel. Precipitation hardening stainless steel is prone to deformation due to phase transformation upon heating and cooling. However, according to the method of manufacturing a turbine blade according to the present invention, deformation of the forging and turbine blade can be effectively minimized or prevented.

Advantageous Effects of Invention

The present invention can, in the manufacture of a stainless steel turbine blade, minimize or prevent deformation caused in a stainless steel member at the cooling stage post heat treatment of the member.

DESCRIPTION OF EMBODIMENTS

Embodiments of the present invention will now be described in details with reference to the drawings.

Steam Turbine

Figure 1:
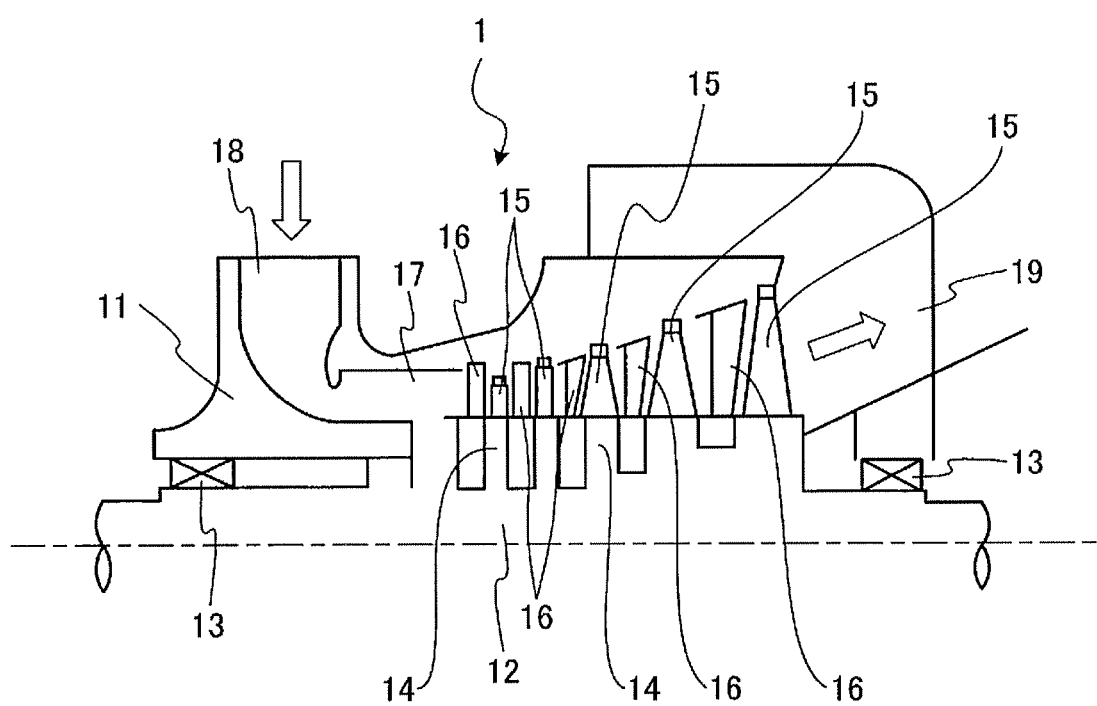
FIG. 1 is a schematic view of a configuration of a steam turbine provided with a blade according to an embodiment.

FIG. 1 is a schematic view of the configuration of a steam turbine provided with a blade according to an embodiment. As illustrated in FIG. 1, the steam turbine 1 includes a hollow casing 11 and a rotor 12, i.e. rotating shaft, journaled by a plurality of bearings 13 in a manner to allow free rotational motion. Turbine blades 15 and vanes 16 are disposed inside the casing 11. The turbine blades 15 are fixed to the periphery of disk-shaped rotor disks 14 formed on the rotor 12, disposed in a row around the circumferential direction of the periphery of the disk-shaped rotor disks 14. The vanes 16 are fixed to the inner wall of the casing 11, disposed in a row around the circumferential direction of the inner wall. These turbine blades 15 and vanes 16 are disposed alternately in the axial direction of the rotor 12.

Inside the casing 11, the turbine blades 15 and the vanes 16 are disposed and a steam flow path 17 through which steam passes is formed. The steam flow path 17 is formed with a steam supply port 18, which is an inlet in which steam is supplied, and a steam exhaust port 19, which is an outlet through which steam is released out.

Structure of Turbine Blade

Figure 2:
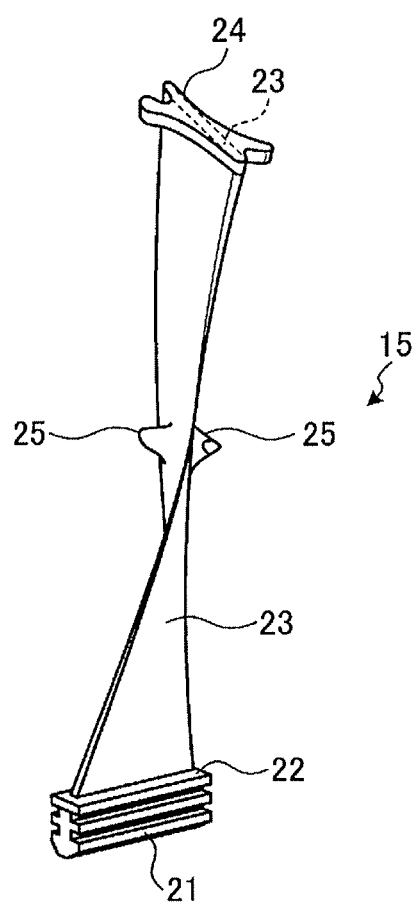
FIG. 2 is a schematic view illustrating a turbine blade according to an embodiment.

FIG. 2 is a schematic view illustrating a turbine blade according to an embodiment. The turbine blade 15 includes a blade root 21, a platform 22, a blade 23, and a shroud 24. The turbine blade 15 is fixed to the rotor disk 14 by the blade root 21 being embedded in the rotor disk 14. The platform 22 is a curved plate-shaped member formed integrally with the blade root 21. The blade 23 includes a base end fixed to the platform 22 and a distal end extending toward the inner wall surface of the casing 11, and is twisted along the blade longitudinal direction. The shroud 24 is a member fixed to the distal end of the blade 23. The shrouds 24 of adjacent turbine blades 15 come into contact with one another to secure the turbine blade 15 and minimize or prevent oscillation of the turbine blade 15.

A projection-like stub 25 is formed on both surfaces of the blade 23 in substantially the center region in the blade longitudinal direction. The stubs 25 of adjacent turbine blades 15 come into contact with one another to secure the turbine blade 15 and minimize or prevent oscillation of the turbine blade 15. The turbine blade 15 is a turbine blade for the steam turbine 1 illustrated in FIG. 1. However, the method of manufacturing a turbine blade according to the present embodiment is not limited to blades for turbines.

Method of Manufacturing a Turbine Blade

Figure 3:
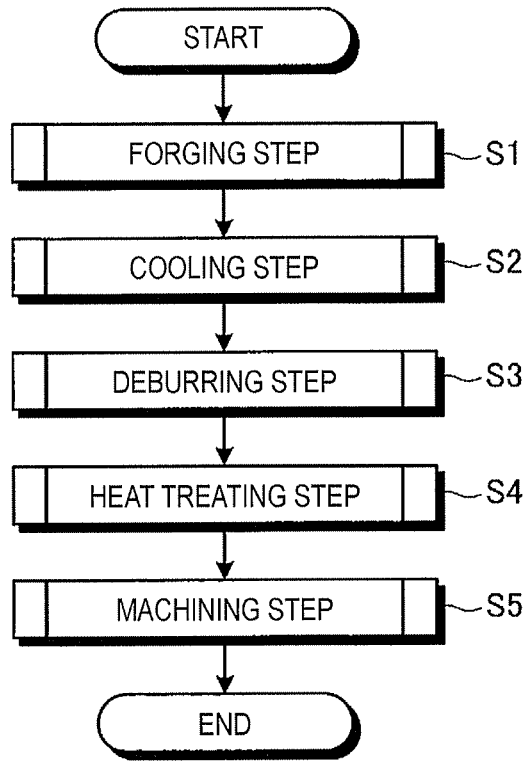
FIG. 3 is a flowchart illustrating an example of a method of manufacturing a turbine blade according to an embodiment.
Figure 4:
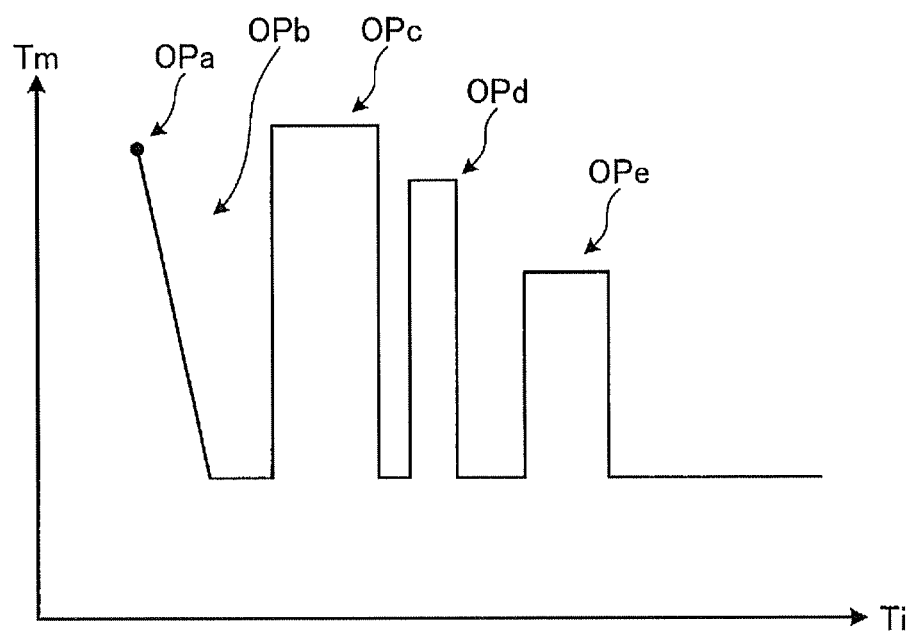
FIG. 4 is a graph showing an example of the change in temperature of a material in a method of manufacturing a turbine blade according to an embodiment.

FIG. 3 is a flowchart illustrating an example of a method of manufacturing a turbine blade according to an embodiment. FIG. 4 is a graph showing an example of the change in temperature of a material in a method of manufacturing a turbine blade according to an embodiment. The vertical axis in FIG. 4 is temperature Tm of a material of the turbine blade 15, and the horizontal axis is change in time Ti. The method of manufacturing a turbine blade according to the present embodiment includes the steps of forging (step S1), cooling (step S2), deburring (step S3), heat treating (step S4), and machining (step S5).

Figure 8:
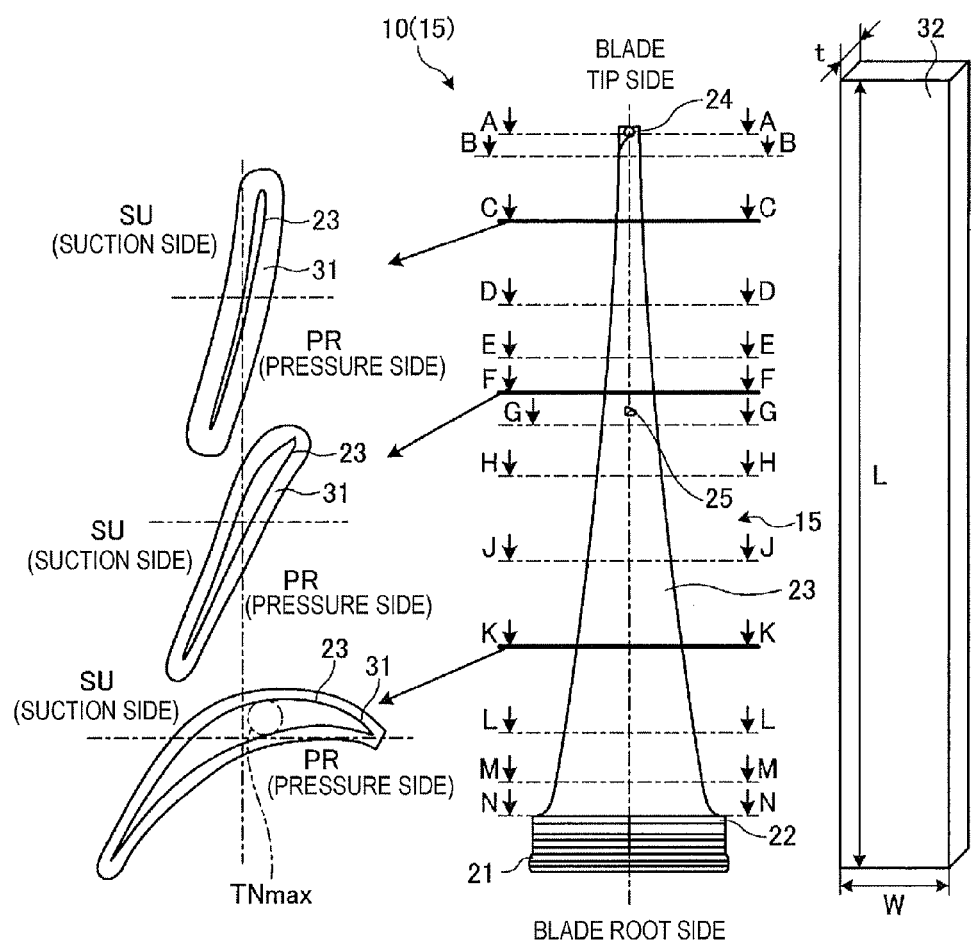
FIG. 8 is a diagram illustrating cross sections at different positions of the forging.

In the forging step of step S1, a material of the turbine blade 15 is heated to equal to or greater than the recrystallization temperature of the material, then placed in a die having a top and bottom machined to have the form of the blade 23 plus a superfluous portion, and impression-die hot forging is carried out. OPa in FIG. 4 denotes the forging step. In the present embodiment, the material of the turbine blade 15 is, for example, stainless steel. Specifically, the material of the turbine blade 15 is precipitation hardening stainless steel such as 17-4 PH. When forging is completed, as illustrated in FIG. 8, a forging with the form of the blade 23 plus the superfluous portion 31 is obtained. Next is the cooling step of step S2.

In the cooling step of step S2, the high-temperature forging obtained in the forging step is cooled. OPb in FIG. 4 denotes the cooling step from the forging step. The forging is cooled until at a temperature suitable for the subsequent deburring step. Next is the deburring step of step S3.

In the deburring step of step S3, unnecessary portions (burrs) of the forging formed by the material being forced into the gap between the top and bottom dies in the die-forging of the forging step are removed. Next is the heat treating step of step S4.

In the heat treating step of step S4, the forging is heat treated. This heat treatment includes solution treatment OPc, stabilization treatment OPd, and aging treatment OPe. In the heat treating step, residual stress in the forging caused in the previous step (forging step) and thermal stress in the forging caused in the cooling stage are relieved, and the forging is age-hardened. Next is the machining step of step S5.

In the machining step of step S5, the superfluous portion of the forging is removed by cutting. Additionally, in the machining step, the platform 22 is formed at the base end side (side of the blade root) of the blade 23 and the shroud 24 is formed at the distal end side (side of the blade tip) via cutting. In such a manner, the turbine blade 15 having the desired final shape is manufactured.

Heat Treating Step

Figure 5:
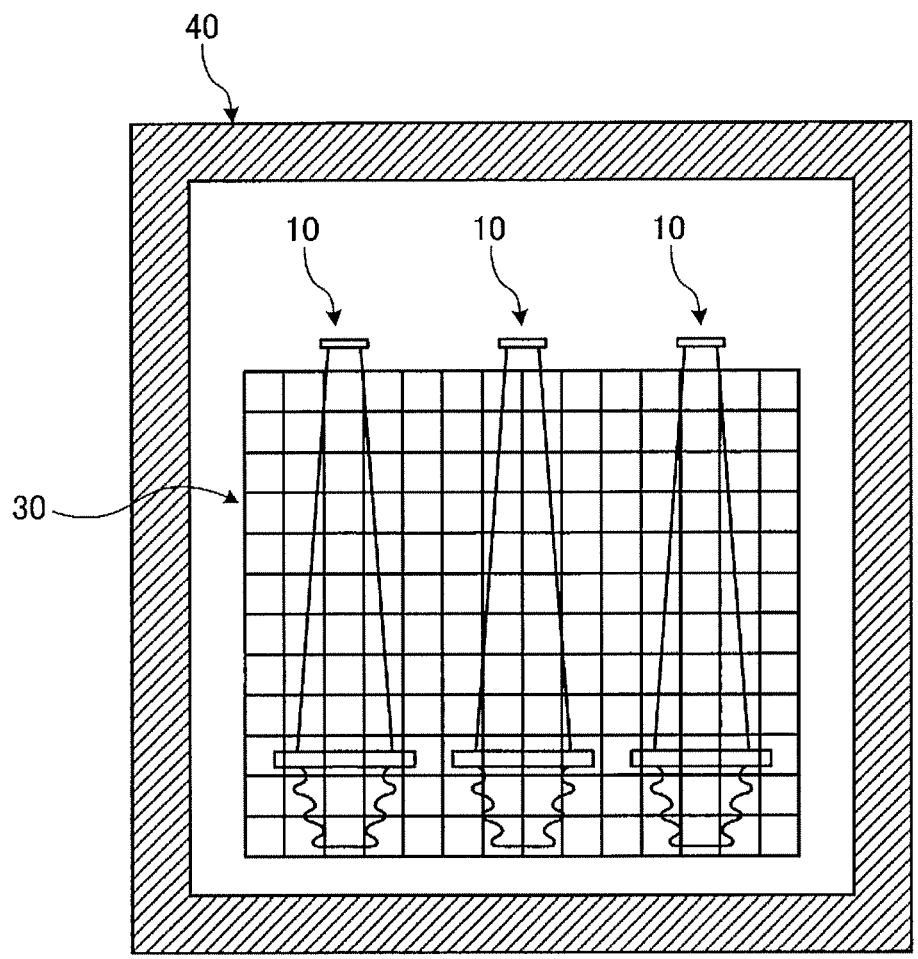
FIG. 5 is a diagram illustrating the state of the forging in the heat treating step.
Figure 6:
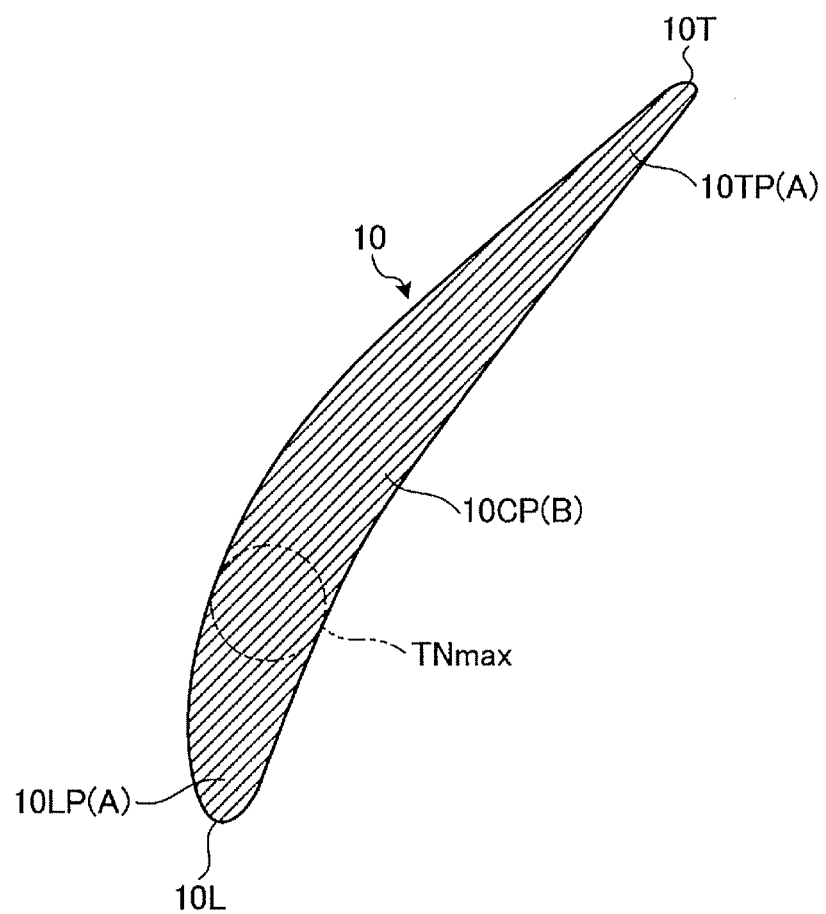
FIG. 6 is a cross-sectional view illustrating the shape of the forging in a cross section along a plane orthogonal to the longitudinal direction of the forging.

FIG. 5 is a diagram illustrating the state of the forging in the heat treating step. FIG. 6 is a cross-sectional view illustrating the shape of the forging in a cross section along a plane orthogonal to the longitudinal direction of the forging. In the heat treating step, the forging 10 is accommodated in an accommodating structure 30 (hereinafter, referred to as basket 30 as appropriate), and then set inside the heating furnace 40. In the aging treatment OPe of the heat treating step, the forging 10 is heated to and held at a temperature of about 500° C. Thereafter, the temperature of the forging 10 must be lowered by about 500° C. within 30 minutes, thus cooling of the forging 10 is necessary.

Typically, a metal member such as the forging 10 has, due to its shape, portions that tend to cool faster (in other words, tend to heat up faster) and portions that tend to cool slower (in other words, tend to heat up slower). The portions of the metal member that tend to cool faster are large surface area portions with a large surface area per unit mass, and the portions of the metal member that tend to cool slower are small surface area portions with a small surface area per unit mass.

For example, in the case of the present embodiment, as illustrated in FIG. 6, the dimensions of the thickness of a leading edge portion 10LP including a leading edge 10L and a trailing edge portion 10TP including a trailing edge 10T in the forging 10 are less than that of a central portion 10CP located between the leading edge portion 10LP and the trailing edge portion 10TP. Consequently, a large surface area portion A with a large surface area per unit mass, and thus a portion that tends to cool faster, is created.

The central portion 10CP located between the leading edge portion 10LP and the trailing edge portion 10TP including a portion TNmax with the maximum diameter (maximum thickness) creates a small surface area portion B with a small surface area per unit mass, and thus a portion that tends to cool slower. When such a metal member is heated or cooled, high temperature portions and low temperature portions are created in the metal member. Thus, large thermal stress in the metal member, and thus deformation and strain, is caused at the heating and cooling stages of the metal member. In addition, when the forging 10 is cooled after the heat treatment, in the initial stages of cooling, a difference in temperature occurs between the maximum diameter portion TNmax of the blade and the leading edge portion 10LP and trailing edge portion 10TP. Consequently, large thermal stress, and thus deformation and strain, is caused in the forging 10. The maximum diameter portion TNmax is the portion with the maximum thickness when the turbine blade 15 is viewed in cross section.

When the metal member is heated in the heating furnace 40, the temperature of the metal member increases in accordance with the rise in the temperature inside the heating furnace 40, that is, the ambient temperature, in which the metal member is disposed. However, when the metal member is removed from the heating furnace 40 for cooling, the ambient temperature becomes room temperature, and thus with respect to the temperature of the metal member, the difference in temperature between this ambient temperature and the temperature of the metal member is great. Thus, the rate of temperature decrease upon cooling is greater than the rate of temperature increase upon heating. Consequently, the difference in temperature between the high temperature portions and the low temperature portions in the metal member is small upon heating, and the difference in temperature between the high temperature portions and the low temperature portions in the metal member is great upon cooling. Thus, by minimizing the difference in temperature between the high temperature portions and the low temperature portions in the metal member upon cooling, thermal stress, and thus deformation and strain, can be minimized or prevented.

In the case of the forging 10 of precipitation hardening stainless steel being cooled after heat treatment, during the cooling, the forging 10 begins to undergo phase transformation upon reaching a temperature equal to or less than the martensite (MS) start temperature. Upon phase transformation, the forging 10 expands. However, this transformation progresses at different rates in the maximum diameter portion TNmax and the leading edge portion 10LP and trailing edge portion 10TP (due to a difference in temperature). The resultant difference in expansion causes stress in the forging 10. In addition, when stress is caused at the transitional stage during phase transformation, the forging 10 is greatly susceptible to deformation (transformation plasticity). Thus, by minimizing the difference in temperature between the maximum diameter portion TNmax (as well as the central portion 10CP) and the leading edge portion 10LP and trailing edge portion 10TP upon cooling of the forging 10 after heat treatment, thermal stress, and thus deformation and strain in the forging 10, can be minimized or prevented.

Figure 7:
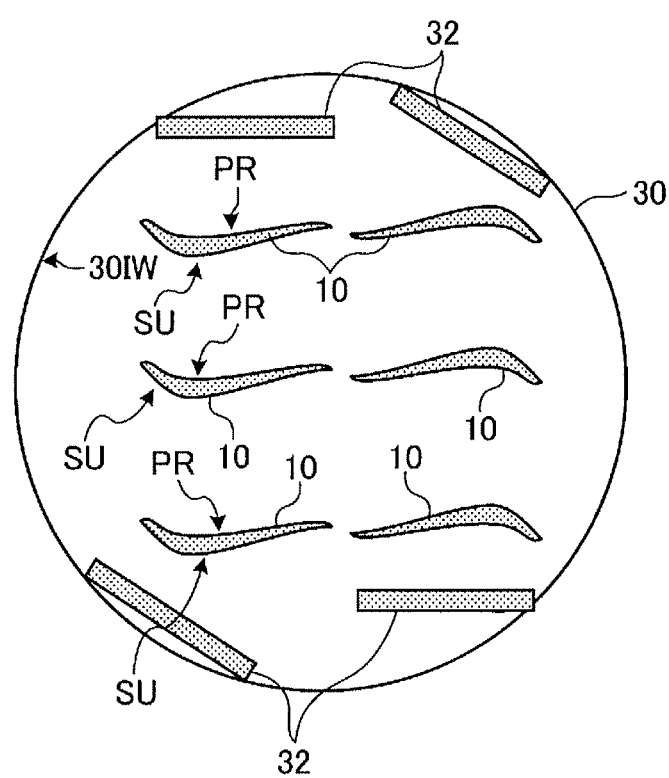
FIG. 7 is a diagram illustrating an example of an arrangement of forgings disposed inside the basket in the method of manufacturing a turbine blade according to the present embodiment.

FIG. 7 is a diagram illustrating an example of an arrangement of forgings disposed inside the basket in the method of manufacturing a turbine blade according to the present embodiment. FIG. 8 is a diagram illustrating cross sections at different positions of the forging. Cutting has not been carried out on the forgings 10 illustrated in FIG. 8, and thus the forgings 10 include the superfluous portions 31 which are removed via cutting. The direction from the blade root toward the blade tip, that is, the direction from the platform 22 toward the shroud 24, is referred to as the longitudinal direction of the turbine blade 15 or forging 10 (blade tip direction). In FIG. 8, a total of 13 positions, A-A to H-H, J-J to N-N, from the shroud 24 toward the platform 22 represent positions along the longitudinal direction of the turbine blade 15 or the forging 10.

In the method of manufacturing a turbine blade according to the present embodiment, in the heat treating step and the cooling step, a plurality of the forgings 10 are accommodated in the basket 30 as illustrated in FIG. 7. The basket 30 in which a plurality of the forgings 10 are accommodated is accommodated in the heating furnace 40 as illustrated in FIG. 5. Then, heat treatment is carried out. When heat treatment is completed, for example, the basket 30 is removed from the heating furnace 40. Then, cooling is carried out.

In the method of manufacturing a turbine blade according to the present embodiment, a plurality of the forgings 10 are arranged in alignment as illustrated in FIG. 7. Adjacent forgings 10 are disposed so that at least respective portions of the portions of the adjacent forgings 10 corresponding to a region from the portion corresponding to the platform 22 of the turbine blade 15 illustrated in FIG. 2 to the center in the longitudinal direction of the turbine blade 15 (blade longitudinal direction) face each other and warm each other via radiant heat. In the present embodiment, a plurality of the forgings 10 are arranged in a row in alignment with the suction side SU and the pressure side PR of the forgings 10 opposing one another, and rows of the forgings 10 are formed. In the example illustrated in FIG. 7, one row of the forgings 10 includes three forging 10. The basket 30 accommodates two rows of the forgings 10. The center of the turbine blade 15 in the longitudinal direction (blade longitudinal direction) is the portion denoted with H-H in FIG. 8.

Non-uniformity in the amount of radiant heat can be minimized or prevented by disposing the forgings 10 in alignment in such a manner. Accordingly, the method of manufacturing a turbine blade according to the present embodiment can minimize or prevent non-uniformity in the cooling rate within a single forging 10, and thus non-uniformity in the deformations of each forging 10.

To minimize or prevent bending of the forging 10, the degree of bending at the starting point of bending is preferably reduced. Thus, after heat treatment and cooling, in the case of bending occurring in the forging 10, at least the starting point of bending and the vicinity thereof are preferably warmed by the radiant heat of adjacent forgings 10. Such an embodiment reduces non-uniformity in the temperature distribution at the starting point of bending between the maximum diameter portion TNmax (or the central portion 10CP) and the leading edge portion 10LP and trailing edge portion 10TP, and thus can effectively minimize or prevent bending of the forging 10. The starting point of bending of the forging 10 is on the platform 22 side of the stub 25, and more specifically, on the platform 22 side of the portion corresponding to the central portion in the longitudinal direction of the turbine blade 15 or the forging 10. In the present embodiment, position K-K is the starting point of bending of the forging 10.

In the present embodiment, as illustrated in FIG. 7, heat insulation shields 32 are preferably disposed between the forgings 10 accommodated opposed to an inner wall 30IW of the basket 30 and the basket 30. The shields 32 are able to reduce the cooling rate of the forgings 10 disposed opposing them. Consequently, the difference in temperature between, for example, a thick portion such as the maximum diameter portion. TNmax and a thin portion such as the leading edge portion 10LP and trailing edge portion 10TP is reduced, and thus deformation of the forgings 10 is minimized or prevented.

In the present embodiment, the shield 32 is a plate-like member as illustrated in FIG. 8. In the present embodiment, the shield 32 is a rectangular member in plan view. In the present embodiment, forgings 10 are accommodated in the basket 30 arranged in alignment so that adjacent forgings 10 warm each other via radiant heat. Opposing forgings 10 and shields 32 also warm each other. Consequently, non-uniformity in the cooling rate of the plurality of forgings 10 accommodated in the basket 30 is minimized or prevented. In the present embodiment, a member having substantially the same radiation rate as the forging 10 is preferably used as the shield 32. The shield 32 preferably has substantially the same radiation rate as the forging 10 due to, for example, the shield 32 being made of the same material as the forging 10, and the color and state of the surface being similar to that of the forging 10, and the like.

As described above, to minimize or prevent bending of the forging 10, the degree of bending at the starting point of bending is preferably reduced. Thus, after heat treatment and cooling, in the case of bending occurring in the forging 10, at least the starting point of bending and the vicinity thereof are preferably warmed by the radiant heat of the shield 32 opposing the forging 10. Such an embodiment reduces non-uniformity in the temperature distribution between the maximum diameter portion TNmax (or the central portion 10CP) and the leading edge portion 10LP and trailing edge portion 10TP, and thus can effectively minimize or prevent bending of the forging 10. As illustrated in FIG. 7, in the present embodiment, the shields 32 are not disposed on the side of the leading edge portion 10LP and the trailing edge portion 10TP.

The forging 10 or turbine blade 15 is twisted from the platform 22 toward the shroud 24. The shield 32 may have a form that conforms to the twist of the forging 10 or turbine blade 15. However, a shield 32 which is a plate-like member, as in the present embodiment, is easy to manufacture. In such a case, the cross section of the forging 10 at the starting point of bending is preferably set so as to oppose the shield 32. In such an embodiment, the starting point of bending and the vicinity thereof are warmed by radiant heat of the shield 32, and thus bending of the forging 10 after cooling is minimized or prevented.

Thickness t of the shield 32, as illustrated in FIG. 8, is preferably the cross-sectional maximum thickness in the portion corresponding to a region from the portion corresponding to the platform 22 of the turbine blade 15 to the center in the longitudinal direction of the turbine blade 15, in other words, a thickness identical to that of the maximum diameter portion TNmax. In such a case the thickness t of the shield 32 is preferably the cross-sectional maximum thickness at the starting point of bending, in other words, a thickness identical to that of the maximum diameter portion TNmax. With such an embodiment, at the starting point of bending where the effect on the bending of the forging 10 is the greatest, the relationship between the forging 10 and the shield 32 in terms of radiant heat can be configured in a manner similar to that of between adjacent forgings 10. As a result, bending of the forging 10 after cooling can be minimized or prevented.

The length L of the shield 32 in the longitudinal direction is a length that allows the shield 32 disposed in the basket 30 to face the starting point of bending of the forging 10. In the present embodiment, the length L of the shield 32 is substantially identical to the length of the forging 10 in the longitudinal direction. With such an embodiment, a certain degree of heat insulation via radiant heat can be anticipated to have an effect on portions other than the starting point of bending of the forging 10.

The width W of the shield 32 in the direction orthogonal to the longitudinal direction is a width that allows the shield 32 disposed in the basket 30 to face the entire range of the forging 10 in the width direction at the starting point of bending. With such an embodiment, the shield 32 can efficiently warm the starting point of bending of the forging 10 via radiant heat.

Figure 9:
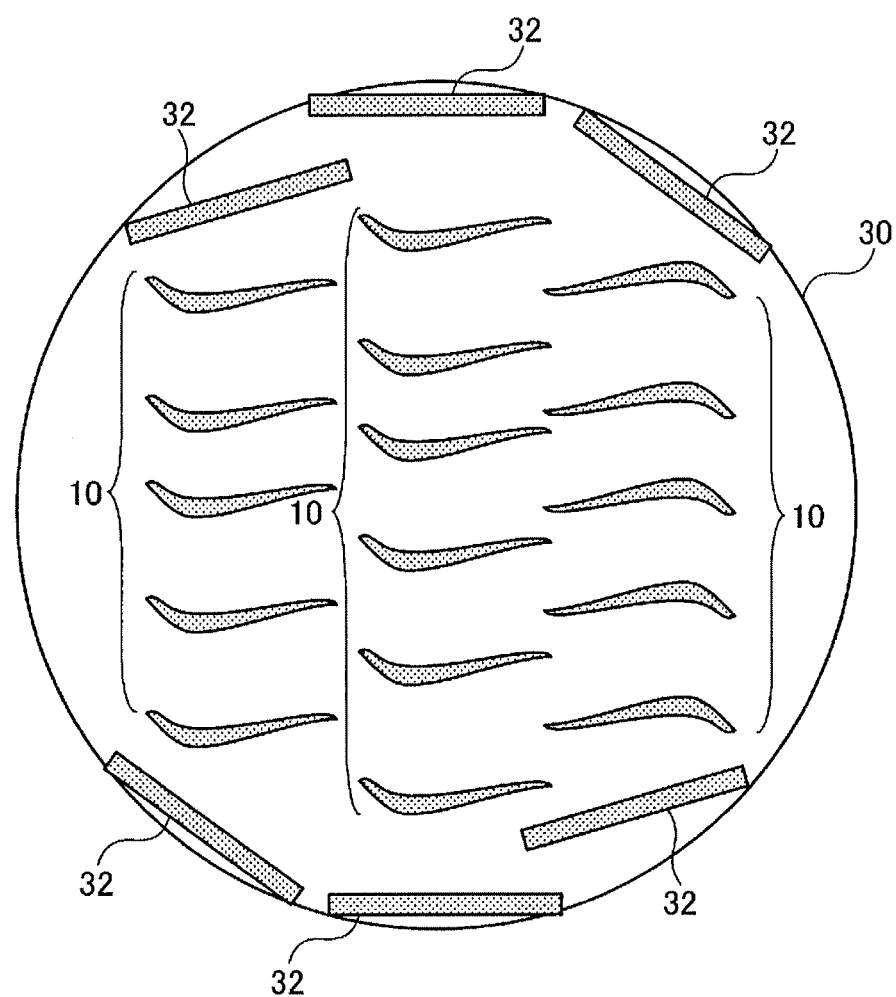
FIG. 9 is a diagram illustrating an example of an arrangement of forgings in the case of a basket larger than that illustrated in FIG. 7 being used.

FIG. 9 is a diagram illustrating an example of an arrangement of forgings in the case of a basket larger than that illustrated in FIG. 7 being used. In the present embodiment, the basket 30 may be any size. When a large basket 30 is used, more forgings 10 can be accommodated therein. In such a case, as described above, a plurality of the forgings 10 may also be arranged in alignment so that at least respective portions of the portions of the forgings 10 corresponding to a region from the portion corresponding to the platform 22 of the turbine blade 15 to the center in the longitudinal direction of the turbine blade 15 face each other and warm each other via radiant heat. In addition, the shields 32 are preferably disposed between the basket 30 and the forgings 10.

Figure 10:
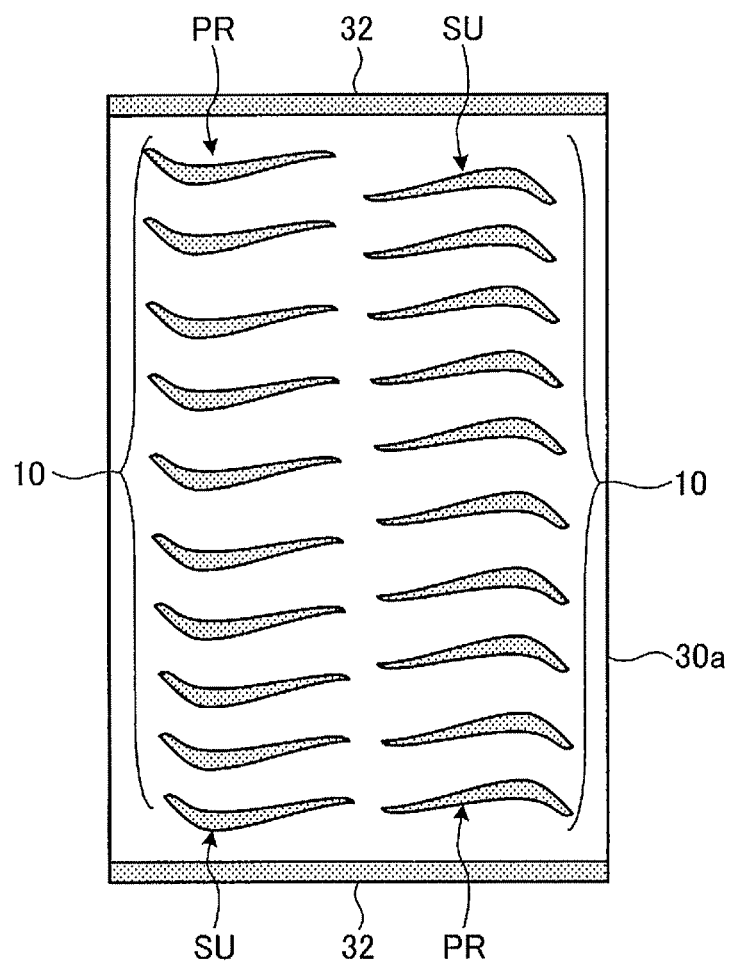
FIG. 10 is a diagram illustrating an example of a basket with a rectangular shape in plan view in which a plurality of the forgings are accommodated.

FIG. 10 is a diagram illustrating an example of a basket with a rectangular shape in plan view in which a plurality of the forgings are accommodated. In the present embodiment, the basket which accommodates the forgings 10 may have any shape. For example, the basket may be the basket 30 with a circular shape in plan view such as those illustrated in FIG. 7 and FIG. 9 or may be the basket 30a with a rectangular shape in plan view such as that illustrated in FIG. 10. In the present example, a plurality of the forgings 10 are arranged in the longitudinal direction of the basket 30a making two rows. The shape of the basket is not limited as long as the plurality of forgings 10 are arranged in alignment so that at least respective portions of the portions of the forgings 10 corresponding to a region from the portion corresponding to the platform 22 of the turbine blade 15 to the center in the longitudinal direction of the turbine blade 15 face each other and warm each other via radiant heat.

The shields 32 are preferably disposed between the basket 30a and the forgings 10. In the present example, the shields 32 are disposed on both sides of the basket 30a in the longitudinal direction. Each of the shields 32 opposes both the suction side SU and the pressure side PR opposite to the suction side SU of the forging 10.

Figure 11:
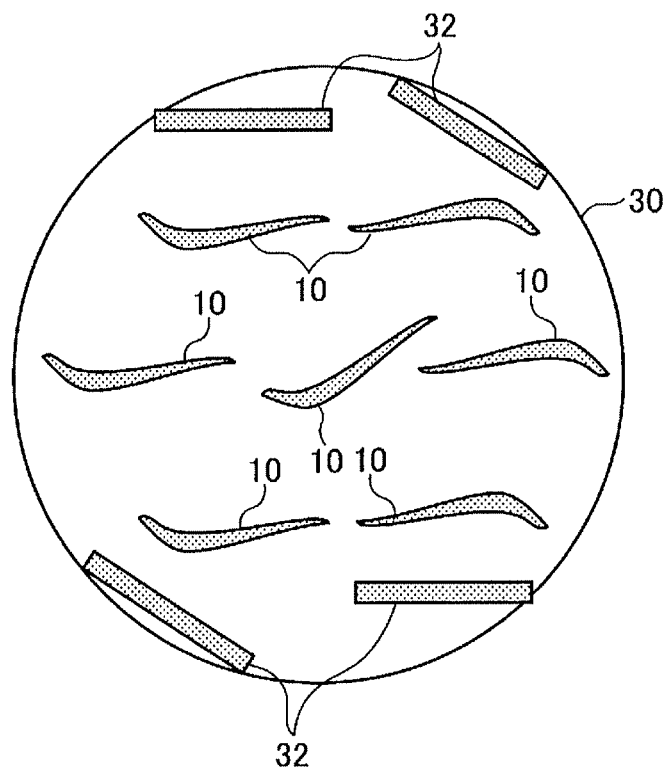
FIG. 11 is a diagram illustrating an example of arrangements of a plurality of the forgings accommodated in a basket with a circular shape in plan view.
Figure 12:
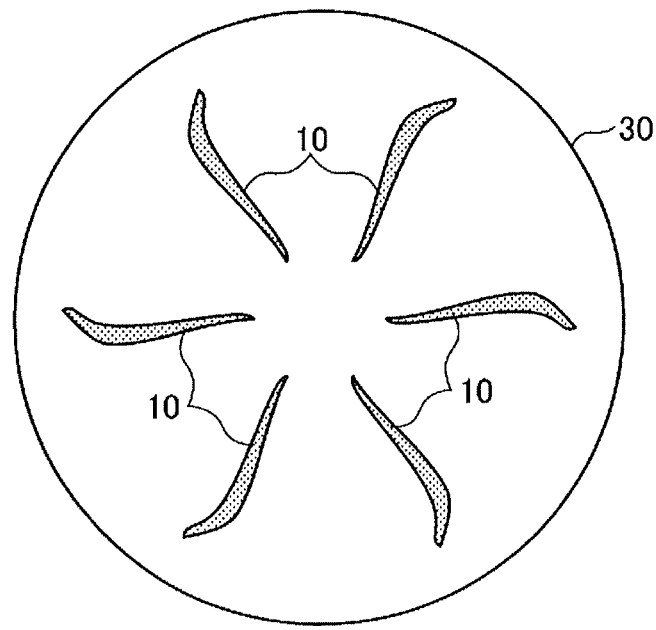
FIG. 12 is a diagram illustrating an example of arrangements of a plurality of the forgings accommodated in a basket with a circular shape in plan view.

FIG. 11 and FIG. 12 are diagrams illustrating other examples of arrangements of a plurality of the forgings 10 accommodated in a basket with a circular shape in plan view. In the example illustrated in FIG. 11, the forgings 10 are not all arranged in alignment. In such an embodiment, though the effect of minimizing or preventing non-uniformity in the temperature of the forgings 10 is reduced, the degree of freedom in which the forgings 10 are disposed in the basket 30 is increased. In the example illustrated in FIG. 12, the forgings 10 are accommodated in the basket 30 with a circular shape in plan view in a radial manner around the center of the basket 30. In such a case, the shields 32 illustrated in FIG. 7 may not be provided in the basket 30. The space that was attributed to the shields 32 can then be used to increase the number of forgings 10 the basket 30 can accommodate. Though the forgings 10 are not warmed by radiant heat from the shields 32, the forgings 10 are warmed by the radiant heat from adjacent forgings 10. Thus, with the arrangement illustrated in FIG. 12, non-uniformity in the temperature between a plurality of the forgings 10 can be reduced more than in the case in which the shields 32 are used.

Figure 13:
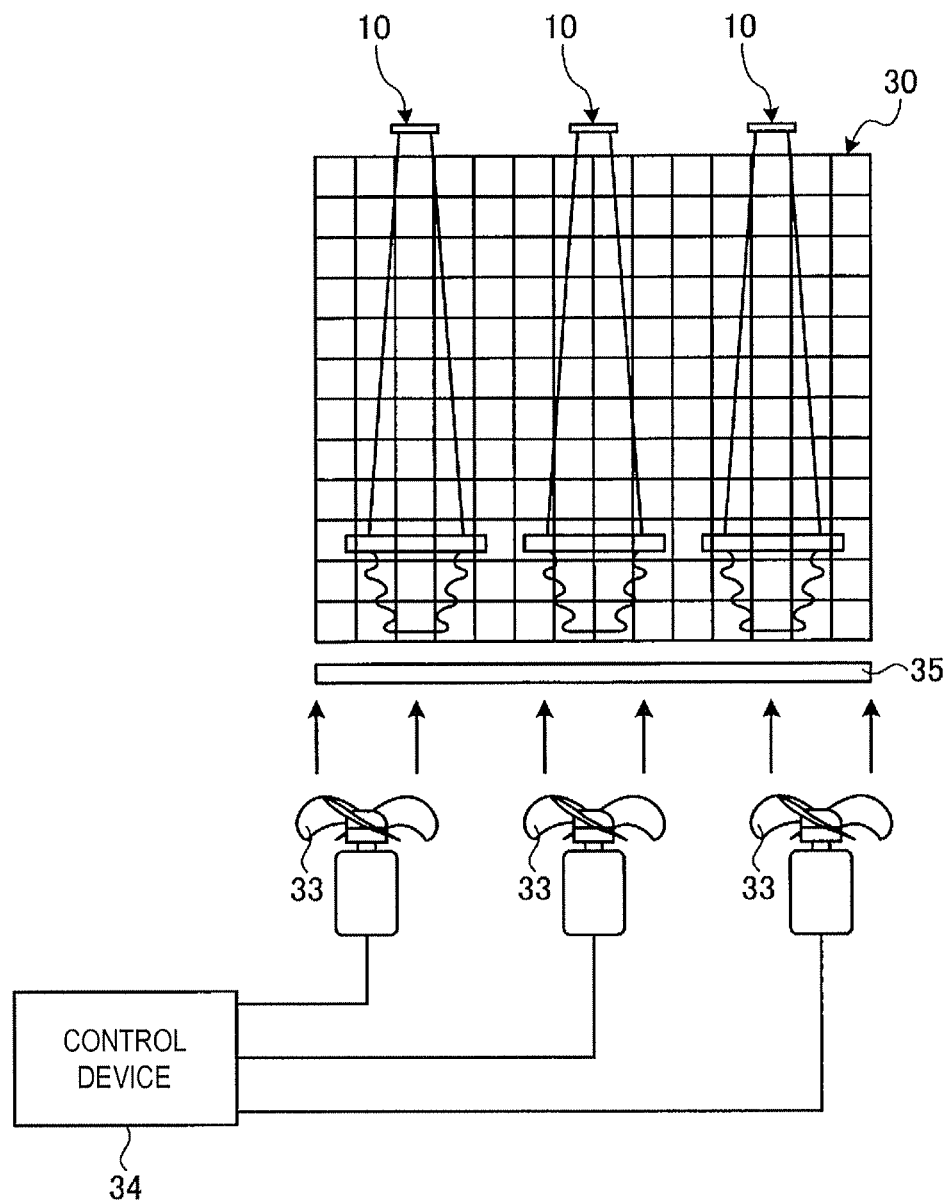
FIG. 13 is a diagram illustrating an example of the cooling step.
Figure 14:
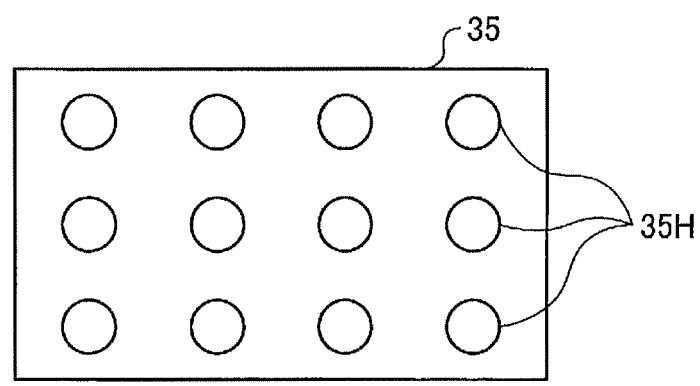
FIG. 14 is a diagram illustrating an example of a rectifying structure.

FIG. 13 is a diagram illustrating an example of the cooling step. FIG. 14 is a diagram illustrating an example of a rectifying structure. In the cooling step after the heat treating step, for example, a fan 33 may blow a cooling gas (hereinafter, referred to as cooling air as appropriate) to a plurality of the forgings 10 accommodated in the basket 30, thus cooling the forgings 10. The fan 33 is controlled by a control device 34. In the present embodiment, as the rectifying structure, a rectifying plate 35 is disposed between the fan 33 and the forgings 10. The rectifying plate 35 includes a plurality of through holes 35H, as illustrated in FIG. 14. The cooling air blown by the fan 33 passes through the plurality of through holes 35H to be rectified and reach the forgings 10. Deformations in the forgings 10 during cooling are minimized or prevented by cooling the forgings 10 with rectified cooling air from the fan 33. In other words, the rectifying plate 35 mitigates the effects on the forgings 10 from direct contact of the cooling air from the fan 33, and thus enables control of the cooling rate. The size and number of the through holes 35H provided on the rectifying plate 35 may be modified to accord with desired cooling conditions of the cooling of the forgings 10.

In the present embodiment, an example has been described in which precipitation hardening stainless steel is used as the material of the forging 10. In a similar manner to that of precipitation hardening stainless steel, a phase transformation occurs in martensitic stainless steel, ferritic stainless steel, austenitic stainless steel, and austenitic-ferritic duplex stainless steel upon heating and cooling, and thus these materials can be applied in the method of manufacturing a turbine blade according to the present embodiment as the material used to manufacture the turbine blade 15.

As described above, the method of manufacturing a turbine blade according to the present embodiment is capable of reducing the difference in temperature between a thick portion and a thin portion by reducing the cooling rate. Consequently, in the manufacture of a stainless steel turbine blade, deformation (strain) caused in the stainless steel member at the cooling stage after heat treatment can be minimized or prevented, and thus residual stress can be reduced. The method of manufacturing a turbine blade according to the present embodiment is capable of reducing the work load associated with correction of strain carried out in the step after cooling and minimizing deformations in the machining performed thereafter.

The present embodiment is not to be construed as limited by the foregoing description. The constituent elements of the present embodiment include elements that are able to be easily conceived by a person skilled in the art, elements that are substantially the same, that is, elements of an equivalent scope. The various constituent elements described above may also be combined, as appropriate. In addition, it is possible to make various omission, substitutions, and changes to the constituent elements within a range not departing from the scope of the present embodiment.

REFERENCE SIGNS LIST

1 Steam turbine
10 Forging
10CP Central portion
10L Leading edge
10LP Leading edge portion
10T Trailing edge
10TP Trailing edge portion
11 Casing
12 Rotor
13 Bearing
14 Rotor disk
15 Turbine blade
16 Vane 17 Steam flow path
18 Steam supply port
19 Steam exhaust port
21 Blade root
22 Platform
23 Blade
24 Shroud
25 Stub
30, 30a Basket (accommodating structure)
30IW Inner wall
31 Superfluous portion
32 Shield
33 Fan
34 Control device
35 Rectifying plate
35H Through hole
40 Heating furnace
A Large surface area portion
B Small surface area portion
L Length
OPc Solution treatment
OPd Stabilization treatment
OPe Aging treatment
PR Pressure side
SU Suction side
Ti Change in time
Tm Temperature
TNmax Maximum diameter portion
W Width

The invention claimed is:

1. A method of manufacturing a turbine blade, the method comprising:
   forming a forging by forging stainless steel;
   heat treating the forging; and
   cooling the forging after the heat treatment; wherein:
   in the heat treatment and the cooling,
   a plurality of the forgings are arranged in alignment, and adjacent forgings of the plurality of forgings are disposed so that: (i) at least respective portions of portions of the adjacent forgings corresponding to a region from a portion corresponding to a platform of a turbine blade to a center in a longitudinal direction of the turbine blade face each other and warm each other via radiant heat, and (ii) non-uniformity in a cooling rate between a large surface area portion with a large surface area per unit mass and a small surface area portion with a small surface area per unit mass is suppressed.

2. The method of manufacturing a turbine blade according to claim 1, wherein:
   the plurality of forgings are accommodated in an accommodating structure to carry out the heat treatment and the cooling; and
   a heat insulation shield is disposed between the forging accommodated opposite to an inner wall of the accommodating structure and the accommodating structure.

3. The method of manufacturing a turbine blade according to claim 1, wherein:
   the heat insulation shield is a plate member; and
   a thickness of the heat insulation shield is identical to a cross-sectional maximum thickness in the portion of the forging corresponding to the region from the portion corresponding to the platform of the turbine blade to the center in the longitudinal direction of the turbine blade.

4. The method of manufacturing a turbine blade according to claim 3, wherein
   the cross-sectional maximum thickness is a cross-sectional maximum thickness at a starting point of bending of the forging occurring after the heat treatment.

5. The method of manufacturing a turbine blade according to claim 1, wherein
   in the cooling, rectified cooling gas is supplied to the plurality of forgings.

6. The method of manufacturing a turbine blade according to claim 1, wherein
   the stainless steel is precipitation hardening stainless steel.

7. The method of manufacturing a turbine blade according to claim 1, wherein
   the plurality of forgings are arranged in alignment in a row with suction sides of the plurality of forgings opposing pressure sides of the plurality of forgings.

8. The method of manufacturing a turbine blade according to claim 7, wherein
   the plurality of forgings form a plurality of rows.

9. The method of manufacturing a turbine blade according to claim 1, wherein:
   the plurality of forgings include first forgings and second forgings,
   the first forgings are arranged in alignment in a row with suction sides of the first forgings opposing pressure sides of the first forgings, and
   the second forgings are not arranged in alignment.

10. The method of manufacturing a turbine blade according to claim 1, wherein
    the plurality of forgings are accommodated in a structure for accommodation to be heat treated and cooled, and the plurality of forgings are disposed in a radial manner around a center of the structure.

* * * * *